(12) United States Patent
Boyd et al.

(10) Patent No.: US 7,089,446 B2
(45) Date of Patent: Aug. 8, 2006

(54) METHOD, SYSTEM, AND ARTICLE OF MANUFACTURE FOR CREATING A CONSISTENT COPY

(75) Inventors: Kenneth Wayne Boyd, Tucson, AZ (US); Kenneth Fairclough Day, III, Tucson, AZ (US); Philip Matthew Dudas, Tucson, AZ (US); William Frank Micka, Tucson, AZ (US); John Jay Wolfgang, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 589 days.

(21) Appl. No.: 10/339,957

(22) Filed: Jan. 9, 2003

(65) Prior Publication Data

US 2004/0139366 A1 Jul. 15, 2004

(51) Int. Cl.
*G06F 11/00* (2006.01)

(52) U.S. Cl. .......................................... 714/6
(58) Field of Classification Search ................ 714/6
See application file for complete search history.

(56) References Cited

U.S. PATENT DOCUMENTS

| 5,504,861 | A |   | 4/1996  | Crockett et al. |         |
|-----------|---|---|---------|-----------------|---------|
| 5,615,329 | A |   | 3/1997  | Kern et al.     |         |
| 5,649,152 | A | * | 7/1997  | Ohran et al.    | 711/114 |
| 5,835,953 | A | * | 11/1998 | Ohran           | 711/162 |
| 6,131,148 | A | * | 10/2000 | West et al.     | 711/162 |
| 6,694,447 | B1| * | 2/2004  | Leach et al.    | 714/6   |
| 6,718,447 | B1| * | 4/2004  | Cochran         | 711/162 |
| 6,912,629 | B1| * | 6/2005  | West et al.     | 711/161 |
| 6,948,089 | B1| * | 9/2005  | Fujibayashi     | 714/6   |

* cited by examiner

*Primary Examiner*—Scott Baderman
*Assistant Examiner*—Brian J. Assessor
(74) *Attorney, Agent, or Firm*—Janaki K. Davda; Konrad Raynes & Victor, LLP

(57) ABSTRACT

Disclosed is a system, method, and article of manufacture for maintaining consistent copies of data between a primary site and a secondary site.

One or more backup components receive backup messages from the primary site describing transactions. Transactions received from the primary site at the backup components are referred to as "inbound transactions." The backup components associate these inbound transactions with an identifier such that all transactions associated with a certain identifier comprise all of the activity on the consistency group for a certain period of time. The backup captain periodically notifies the backup components to pause (i.e., stop receiving inbound transactions temporarily), and once all backup components indicate that they have paused, the backup components are notified to resume receiving transactions and associate the newly received transactions with a new identifier.

At the same time, the backup components are sending transactions to the secondary storage devices. Transactions sent from caches at the backup components to the secondary site are referred to as "outbound transactions." The backup components send all transactions from the current outbound consistent transactions set, temporarily stop sending outbound transactions, and notify the backup captain that they have completed sending the current outbound consistent transactions set. When all backup components have completed sending the current outbound consistent transactions set, the backup captain causes consistent copies to be made at secondary storage and notifies the backup components to send the next outbound consistent transactions set.

40 Claims, 10 Drawing Sheets

METHOD, SYSTEM, AND ARTICLE OF MANUFACTURE FOR CREATING A CONSISTENT COPY

CROSS-REFERENCE TO RELATED APPLICATIONS

This application is related to commonly owned and copending application Ser. No. 10/340,354 entitled "Method, System, and Article of Manufacture for Maintaining Data Integrity," by K. W. Boyd, et al., filed on the same date herewith, and which is incorporated by reference herein in its entirety.

BACKGROUND OF THE INVENTION

1. Field of the Invention

The present invention is directed to creating a consistent copy of data.

2. Description of the Related Art

Disaster recovery systems typically address two types of failures, a sudden catastrophic failure at a single point in time or data loss over a period of time. In the second type of gradual disaster, updates to volumes may be lost. To assist in recovery of data updates, a copy of data may be provided at a remote location. Such dual or shadow copies are typically made as the application system is writing new data to a primary storage device. International Business Machines Corporation (IBM), the assignee of the subject patent application, provides two systems for maintaining remote copies of data at a secondary storage device, extended remote copy (XRC®) and peer-to-peer remote copy (PPRC®).

These systems provide a method for recovering data updates between a last, safe backup and a system failure. Such data shadowing systems can also provide an additional remote copy for non-recovery purposes, such as local access at a remote site. The IBM XRC® and PPRC® systems are described in IBM publication "Remote Copy: Administrator's Guide and Reference," IBM document no. SC35-0169-02 (IBM Copyright 1994, 1996), which publication is incorporated herein by reference in its entirety.

In such backup systems, data is maintained in volume pairs. A volume pair is comprised of a volume in a primary storage device and a corresponding volume in a secondary storage device that includes a consistent copy of the data maintained in the primary volume. Typically, the primary volume of the pair will be maintained in a primary direct access storage device (DASD) and the secondary volume of the pair is maintained in a secondary DASD shadowing the data on the primary DASD. A primary storage controller may be provided to control access to the primary DASD and a secondary storage controller may be provided to control access to the secondary DASD.

In the IBM XRC® environment, the application system writing data to the primary volumes includes a sysplex timer which provides a time-of-day (TOD) value as a time stamp to data writes. The application system time stamps data sets when writing such data sets to volumes in the primary DASD. The integrity of data updates is related to insuring that updates are done at the secondary volumes in the volume pair in the same order as they were done on the primary volume. In the XRC® and other prior art systems, the time stamp provided by the application program determines the logical sequence of data updates. In many application programs, such as database systems, certain writes cannot occur unless a previous write occurred; otherwise the data integrity would be jeopardized. Such a data write whose integrity is dependent on the occurrence of previous data writes is known as a dependent write. For instance, if a customer opens an account, deposits $400, and then withdraws $300, the withdrawal update to the system is dependent on the occurrence of the other writes, the opening of the account and the deposit. When such dependent transactions are copied from the primary volumes to secondary volumes, the transaction order must be maintained to maintain the integrity of the dependent write operation.

Volumes in the primary and secondary DASDs are consistent when all writes have been transferred in their logical order, i.e., all dependent writes transferred first before the writes dependent thereon. In the banking example, this means that the deposit is written to the secondary volume before the withdrawal. A consistency group is a collection of related volumes that need to be kept in a consistent state. A consistency transaction set is a collection of updates to the primary volumes such that dependent writes are secured in a consistent manner. For instance, in the banking example, in order to maintain consistency, the withdrawal transaction needs to be in the same consistent transactions set as the deposit or in a later consistent transactions set; the withdrawal cannot be in an earlier consistent transactions set. Consistency groups maintain data consistency across volumes. For instance, if a failure occurs, the deposit will be written to the secondary volume before the withdrawal. Thus, when data is recovered from the secondary volumes, the recovered data will be consistent.

A consistency time is a time the system derives from the application system's time stamp to the data set. A consistency group has a consistency time for all data writes in a consistency group having a time stamp equal or earlier than the consistency time stamp. In the IBM XRC® environment, the consistency time is the latest time to which the system guarantees that updates to the secondary volumes are consistent. As long as the application program is writing data to the primary volume, the consistency time increases. However, if update activity ceases, then the consistency time does not change as there are no data sets with time stamps to provide a time reference for further consistency groups. If all the records in the consistency group are written to secondary volumes, then the reported consistency time reflects the latest time stamp of all records in the consistency group. Methods for maintaining the sequential consistency of data writes and forming consistency groups to maintain sequential consistency in the transfer of data between a primary DASD and secondary DASD are described in U.S. Pat. Nos. 5,615,329 and 5,504,861, which are assigned to IBM, the assignee of the subject patent application, and which are incorporated herein by reference in their entirety.

Typically, there is a lag between the time at which a primary storage device is updated and the time at which the secondary storage device is updated. For example, a bank customer may make a payment from a savings account into a loan account. There are two parts to this transaction-withdrawal from the savings account and payment to the loan account. The two parts of the transaction should be done and archived atomically. In some cases, the primary storage device may fail while a transaction is being performed. For example, data about the payment from the savings account may be sent to the secondary storage, while the withdrawal data is not sent due to system failure. In this, case, the primary storage device reflects both the withdrawal and payment, while the secondary storage device reflects only the payment. Thus, it is possible that after a disaster and recovery, only one part of the transaction is applied from the secondary storage device to the primary storage device, so that the restored account records reflect the payment in the loan account, but not the withdrawal from the savings account. In this example, the bank will lose money in the amount of the withdrawal from the savings account, which remains in the customer's account. Since the bank loses money, the bank will be unhappy with the disaster recovery.

In disaster recovery scenarios, the data restored from the secondary storage device needs to be consistent to provide value to a customer. Thus, there is a need in the art for improved creation of consistent copies at the secondary storage device.

SUMMARY OF THE INVENTION

Provided are a method, system, and article of manufacture for creating a consistent copy. At each component in a cluster of components, wherein one component is a captain, a first cached consistent transactions set is forwarded to a secondary storage device, and a notification is issued to the captain to indicate that the first cached consistent transactions set has been forwarded. Upon receiving notifications from each component at the captain, notifications are issued to one or more secondary storage devices to create one or more consistent copies of data from secondary data to reflect data at corresponding primary storage devices, and a notification is issued to each component to forward a second cached consistent transactions set to the secondary storage devices.

In still further implementations, a method, system, and article of manufacture for creating consistent transactions sets is disclosed. One or more backup components are notified to pause (i.e., temporarily stop receiving inbound transactions associated with a current identifier). Upon receiving an indication from each backup component that the backup component has paused, each backup component is notified to resume receiving inbound transactions.

In still further implementations, upon receiving an indication to pause, each backup component places inbound transactions into a current consistent transactions set with a current identifier.

In further implementations, upon receiving an indication to pause, each backup component associates inbound transactions with a new consistent transactions set.

The described implementations of the invention provide a method, system, and article of manufacture for maintaining data consistency across different storage devices. Implementations of the invention are particularly useful for mass storage spaces comprised of volumes spread across numerous storage systems. With implementations of the invention, consistent copies of data are made at a secondary site for use in disaster recovery at a recovery site.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several implementations of the present invention. It is understood that other implementations may be utilized and structural and operational changes may be made without departing from the scope of the present invention.

To ensure point-in-time consistency, implementations of the invention create two copies of data at a secondary site. A first copy of the data at the secondary site is updated constantly and is not necessarily consistent with data at the primary site at any given time. The first copy of the data is also referred to herein as "secondary data." The second copy is a copy of the first copy taken when the first copy at the secondary site is consistent with a consistent transactions set applied at the primary site at some point in time. The second copy, which is also referred to herein as a "consistent copy," may be used for disaster recovery at the recovery site (e.g., a remote site). In addition, if the primary site loses data due to a disaster, the data at the primary site may be restored using a corresponding consistent copy.

In accordance with implementations of the invention, consistency is maintained between a primary site and a secondary site. The primary site may be a set of DASD or other storage media that store data that may be accessed by multiple users. The secondary site may include a set of DASD or other storage media that store data used to recover data at the primary site when the primary site requires disaster recovery. A cluster of backup components reside between the primary site and the secondary site. Each backup component in the cluster of components can communicate with each other backup component in the cluster. Backup components, such as personal computers, receive or intercept messages for backing up data ("backup messages") from the primary site and route the messages to the secondary site.

One of the backup components is referred to herein as a "backup captain," and the remaining backup components are referred to herein as "backup members." The backup components receive backup messages from the primary site describing transactions (e.g., pending I/O requests). Transactions received from the primary site at the backup components are referred to as "inbound transactions." The backup components associate these inbound transactions with an identifier such that all transactions associated with a certain identifier comprise all of the activity on the consistency group for a certain period of time and all transactions associated with the identifier form a consistent transactions set. The backup captain periodically notifies the backup components to pause (i.e., stop receiving inbound transactions temporarily), and once all backup components indicate that they have paused, the backup components are notified to resume receiving transactions and associate the newly received transactions with a new identifier (i.e., form a new consistent transactions set). It is this pause across all backup components that ensures point-in-time consistency. That is, at a point in time, if all transactions of a consistent transactions set were applied to the secondary volumes, the secondary volumes would be exact copies of the corresponding primary volumes at the time the transactions in the consistent transactions set were applied at the corresponding primary volumes.

Simultaneously, the backup components may be sending previously cached transactions to the secondary storage devices. Transactions sent from caches at the backup components to the secondary site are referred to as "outbound transactions." A consistent transactions set in a cache includes one or more outbound transactions. There may be one or more consistent transactions sets in cache, waiting to be sent to secondary storage, at a given point. The backup components send all outbound transactions from the current consistent transactions set (i.e., a current outbound consistent transactions set) that is to be sent to secondary storage, temporarily stop sending outbound transactions, and notify the backup captain that they have completed sending the current outbound consistent transactions set. When all backup components have completed sending the current outbound consistent transactions set, the backup captain causes consistent copies to be made of the now consistent secondary volumes. At this time, the consistent copies are a reflection of the exact state of the primary volumes at the time the current outbound consistent transactions set was formed. Once the consistent copies have been made, the backup captain notifies (e.g., sends a message to) the backup components to send the next outbound consistent transactions set.

Figure 1A:
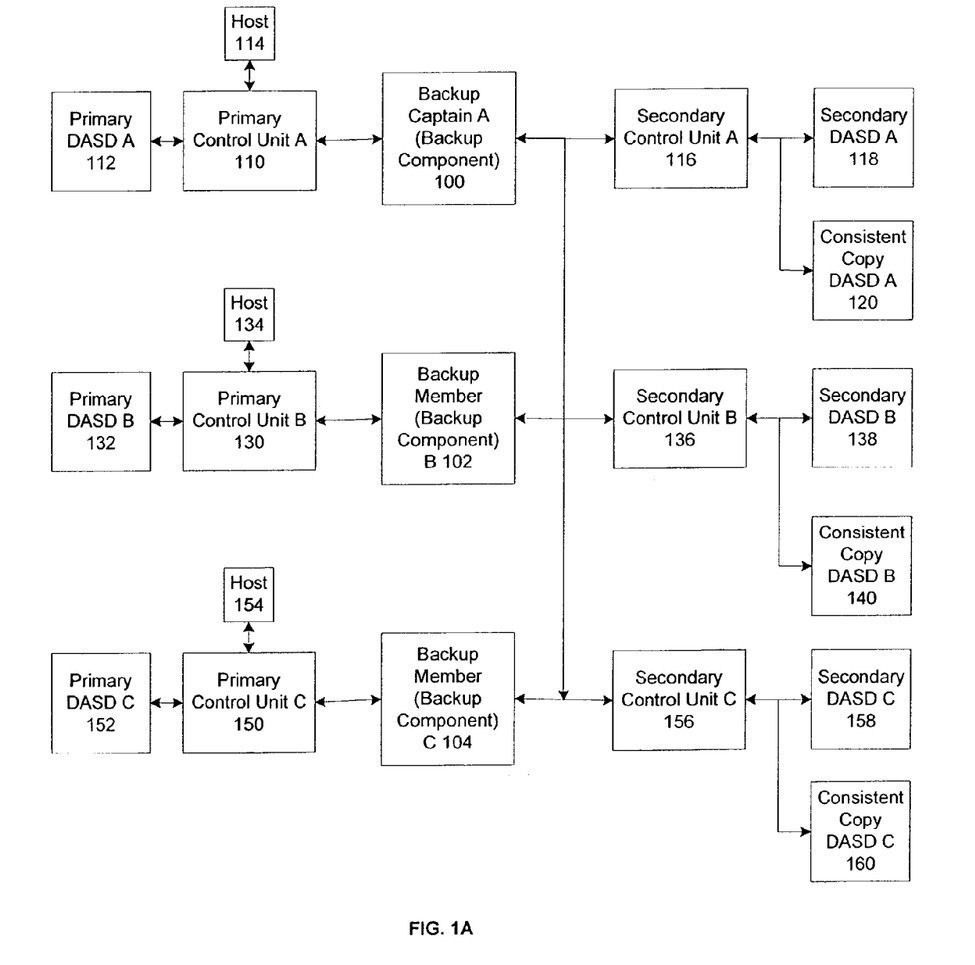
FIG. 1A illustrates, in a block diagram, a computing environment in accordance with some implementations of the invention.

FIG. 1A illustrates, in a block diagram, a computing environment in accordance with some implementations of the invention. Primary control units A 110, B 130, and C 150 provide one or more host computers 114, 134, or 154, respectively, access to primary DASD A 112, B 132, and C 152, respectively. The primary control units A 110, B 130, and C 150 may also have primary caches (not shown) in which updates to tracks in the primary DASD A 112, B 132, and C 152, respectively, are maintained until destaged to primary DASD A 112, B 132, and C 152. Back-up copies of all or a subset of the volumes of the primary DASD A 112, B 132, and C 152 may be maintained at secondary DASD A 118, B 138, and C 158, respectively.

A primary site may include primary control units A 110, B 130, and C 150, primary DASD A 112, B 132, and C152, and host computers 114, 134, and 154. A secondary site may include secondary control units A 116, B 136, and C 156, secondary DASD A 118, B 138, and C158, and consistent copy DASD A 120, B 140, and C 160.

In some implementations, a "volume pair" comprises a volume in the primary DASD and the shadow of that volume in the secondary DASD that maintains a back-up copy of the data at the primary volume in the volume pair. In certain implementations, for each primary volume, there is a corresponding secondary volume with consistent contents; this is a volume pair. For example, updates to the primary DASD A 112 are transferred to the secondary control unit A 116 for storage in the secondary DASD A 118.

The primary control units A 110, B 130, and C 150 may further include a non-volatile storage unit (not shown), such as a battery-backed up volatile memory, to maintain a non-volatile copy of data updates. The primary control units A 110, B 130, and C 150 and secondary control units A 116, B 136, and C 156 may be comprised of the IBM 3990, Model 6 Storage Controller, Enterprise Storage Server, or any other control unit known in the art.

Backup components A 100, B 102, and C 104 transfer updates made to primary DASD A 112, B 132, and C 152 to secondary control units A 116, B 136, and C 156. One of the backup components is referred to as a backup captain A 100, while the remaining backup components are referred to as backup members B 102 and C 104. In some implementations, an administrator identifies one of the backup components A 100, B 102, and C 104 as a backup captain. Each backup component A 100, B 102, and C 104 may include a computer program for transferring backup messages from the primary control units A 110, B 130, and C 150 to the secondary control units A 116, B 136, and C 156, respectively. For example, the computer program for transferring the backup messages may be a system data mover (SDM) program, such as the SDM program included in the IBM XRC® system, that is in communication with the primary control units A 110, B 130, and C 150 and secondary A 116, B 136, and C 156 control units, and manages the transfer of updates to the secondary DASD A 118, B 138, and C 158. Thus, data is transferred between the primary A 110, B 130, and C 150 and secondary A 116, B 136, and C 156 control units via the backup components A 100, B 102, and C 104.

Each backup component A 100, B 102, and C 104 may transfer backup messages from any primary control unit A 100, B 130, and C 150. Each volume from each primary DASD corresponds to a volume on a secondary DASD. For example, a first volume on primary DASD A 112 is backed up to a volume on secondary DASD B 138, and a second volume on primary DASD A 112 is backed up to a volume on secondary DASD C 158. In certain implementations, one or more volumes are not backed up.

For example, backup component A 100 receives backup messages from the primary control unit A 110 indicating updates that should be sent to secondary control unit A 116 for application to secondary DASD A 118, which stores secondary data (i.e., data that is constantly updated). Alternatively, backup component A 100, B 102, and C 104 may intercept updates to primary DASD A 112, B 132, and C 152, respectively, for transfer to secondary control units A 116, B 136, and C 156, respectively.

Primary DASD A 112, B, 132, and C 152 and secondary DASD A 118, B 138, and C 158 contain volumes. In certain implementations, one backup component A 100, B 102, or C 104 processes backup messages for one volume. For example, primary DASD A 112 may include Volume1 and Volume2. Backup component B 102 may process all backup messages with update information for Volume1, while backup component C 104 may process all backup messages with update information for Volume 2. Volume1 and Volume2 on primary DASD A 112 correspond to volumes on secondary DASD A 118.

In certain implementations, the backup components A 100, B 102, and C 104, the primary control units A 110, B 130, C 150, and secondary control units A 116, B 136, and C 156 communicate via communication paths, such as direct high speed transmission lines (e.g., an Enterprise System Connection (ESCON®) link). However, the communication paths may be comprised of any other communication means known in the art, including network transmission lines, fiber optic cables, etc.

Figure 1B:
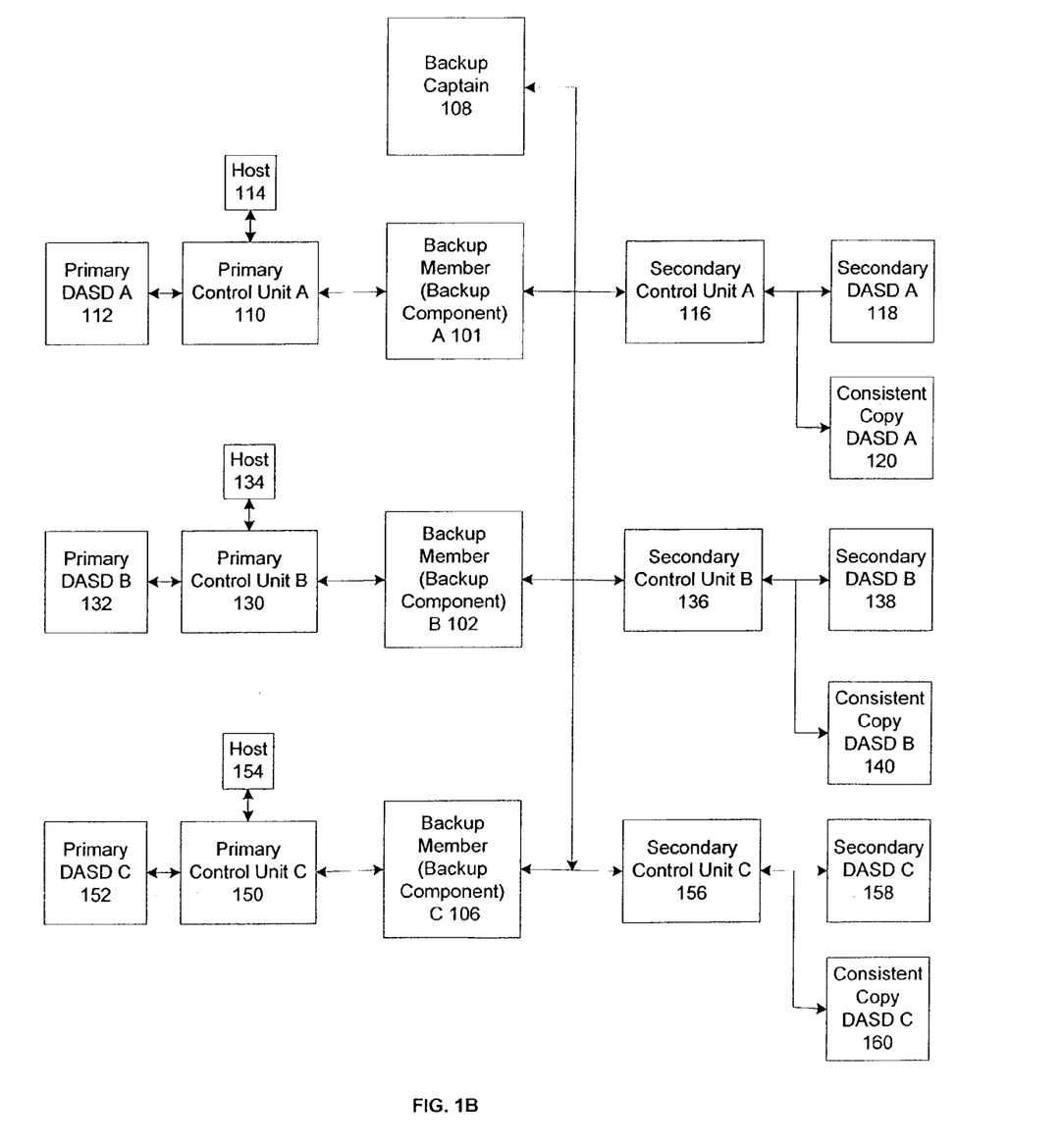
FIG. 1B illustrates, in a block diagram, a computing environment in accordance with alternative implementations of the invention.

FIG. 1B illustrates, in a block diagram, a computing environment in accordance with alternative implementations of the invention. In particular, a separate backup component may be designated a backup captain 108, while the remaining backup components may be designated backup members A 101, B 102, and C 104. Unlike the implementations illustrated in FIG. 1A, the backup captain 108 does not process backup messages between a primary and secondary control unit.

Figure 1C:
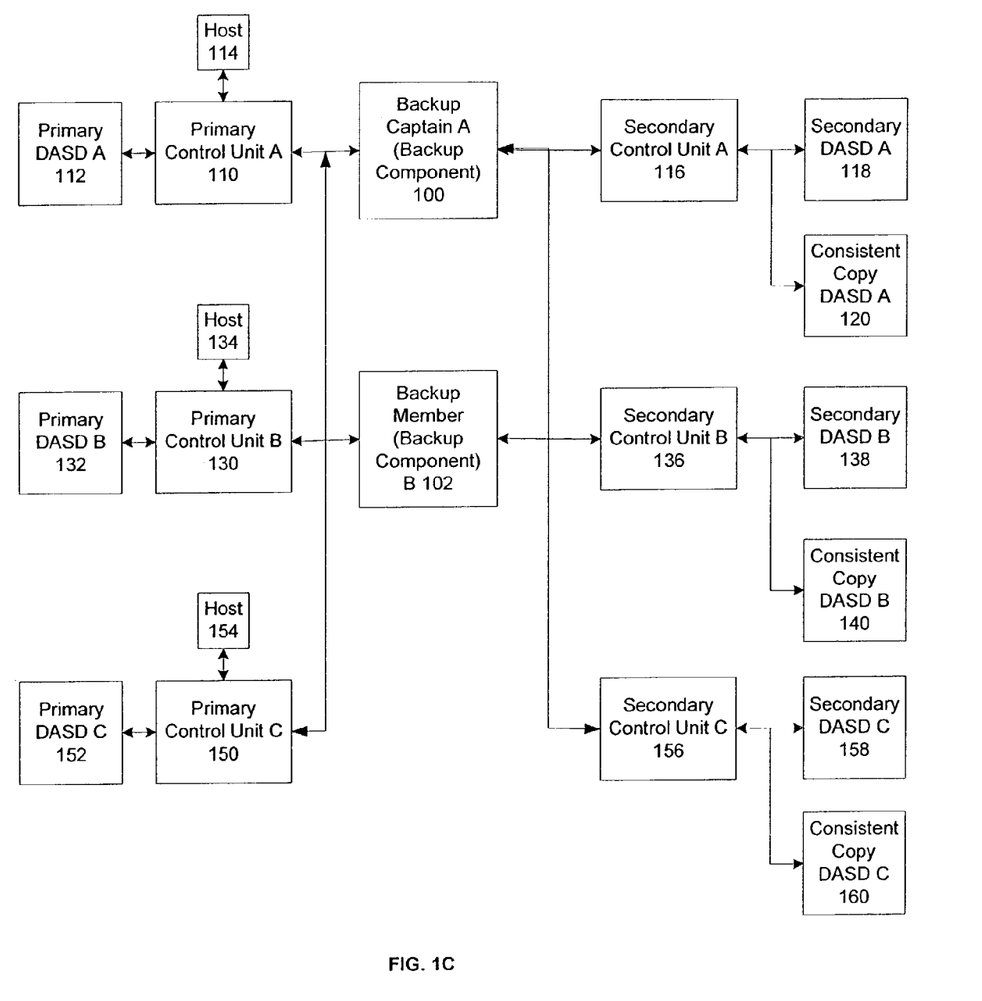
FIG. 1C illustrates, in a block diagram, a computing environment in accordance with alternative implementations of the invention.

FIG. 1C illustrates, in a block diagram, a computing environment in accordance with alternative implementations of the invention. In particular, there may be fewer backup components A 100 and B 102 than there are primary control units A 110, B 130, and C 150. Each primary control unit A 110, B 130, or C 150 may be linked to one or more backup components A 100 or B 102.

With implementations of the invention, backup components A 100, B 102, and C 104 receive inbound transactions and associate the inbound transactions with a first identifier (i.e., all transactions associated with the same identifier form a consistent transactions set). When the backup components A 100, B 102, and C 104 are notified by the backup captain A 100 to pause, each backup component A 100, B 102, and C 104 pauses and notifies the backup captain A of the pause. When the backup captain A 100 receives notifications from all of the backup components A 100, B 102, and C 104, the captain A 100 notifies the backup components A 100, B 102, and C 104 to transition to processing a second set of transactions, associated with a second identifier. The backup components A 100, B 102, and C 104 resume receiving inbound transactions and to associate the inbound transactions with a second identifier. The backup components A 100, B 102, and C 104 may store multiple sets of transactions, with each set associated with a different identifier (e.g., color).

Moreover, as the backup components A 100, B 102, and C 104 transfer transactions from the cache to secondary control units A 116, B 136, and C 156, the backup components A 100, B 102, and C 104 also receive additional transactions from primary control units A 110, B 130, and C 150. When each backup component A100, B 102, and C 104 has transferred the cached set of transactions associated with a first identifier, each backup component A 100, B 102, and C 104 notifies the backup captain that it has transferred the cached set of transactions and will not transfer additional transactions until notified to do so by the backup captain A 100. When the backup components A 100, B 102, and C 104 are not transferring cached transactions to secondary control units A 116, B 136, and C 156, they are said to be "frozen". When the backup components A 100, B 102, and C 104 are "frozen," the backup captain A 100 notifies the secondary control units A 116, B 136, and C 156 to create consistent copies A 120, B 140, and C 160 based on secondary data A 118, B 138, and C 158. Then, the backup captain A 100 notifies the backup components A 100, B 102, and C 103 that they may transfer additional cached transactions.

Certain implementations of the invention create consistent copies of data at a secondary site for a set of transactions. An identifier is associated with the set of transactions. For example, the identifier may be a color (e.g., green, blue, red, or yellow), an integer, an alphanumeric string, or other identifier. In some implementations, each set of transactions is representative of transactions that were received during a specified period of time. The period of time may be customized for different users. For example, one user may wish to have consistent copies created each hour, while another user may wish to have consistent copies created every day. The period of time may span longer periods, such as several days. The backup captain A 100 associates an identifier with a set of transactions and notifies the backup components A 100, B 102, and C 104 of the identifier to be associated with the set of transactions. For example, the backup captain may associate a particular color (e.g., green) with a collection of transactions occurring between 2:00 p.m. and 3:00 p.m. on a particular day. The backup captain A 100 may cycle through identifiers and reuse them. In certain implementations, the identifiers are unique for different sets of transactions.

With implementations of the invention, backup components A 100, B 102, and C 104 send outbound transactions associated with a first identifier (i.e., a consistent transactions set) to secondary storage from cache. When each backup component A 100, B 102, and C 104 completes sending all outbound transactions associated with a first identifier, each backup component A 100, B 102, and C 104 notifies the backup captain A 100 that they have completed and wait for a notification from the backup captain A 100 to resume sending outbound transactions associated with a second identifier (i.e., another consistent transactions set). When the backup captain A 100 receives notifications that all backup components A 100, B 102, and C 104 have finished sending the transactions associated with the first identifier, the backup captain notifies the secondary site to create consistent copies based on the secondary data. After the consistent copies are created, the backup captain A 100 notifies the backup components A 100, B 102, and C 104 to resume sending transactions associated with the second identifier.

Thus, all I/O transactions associated with an identifier (e.g., with one color) are sent to the secondary site before any I/O transactions associated with another identifier (e.g., with another color). In this manner, when a set of transactions having an associated identifier is completely archived at the secondary site, the secondary data reflects the primary data when the transactions associated with that identifier were processed. Thus, when all I/O transactions for a given identifier have been sent to the secondary data at the secondary site, that group of secondary data is in a consistent state that is desired. At this time, the secondary data is an exact copy of the primary data at the primary site for a set of transactions, and the backup captain A 100 issues a message to the secondary site to create copies from the secondary data. These copies are "consistent" copies that reflect the primary data at the primary site after a particular set of transactions have been applied at the secondary site to the secondary data. At or after this time, the backup captain A 100 notifies the backup components A 100, B 102, and C 104 that they may continue their processing of the next set of transactions, which are associated with a different identifier than the previous set of transactions.

Figure 2:
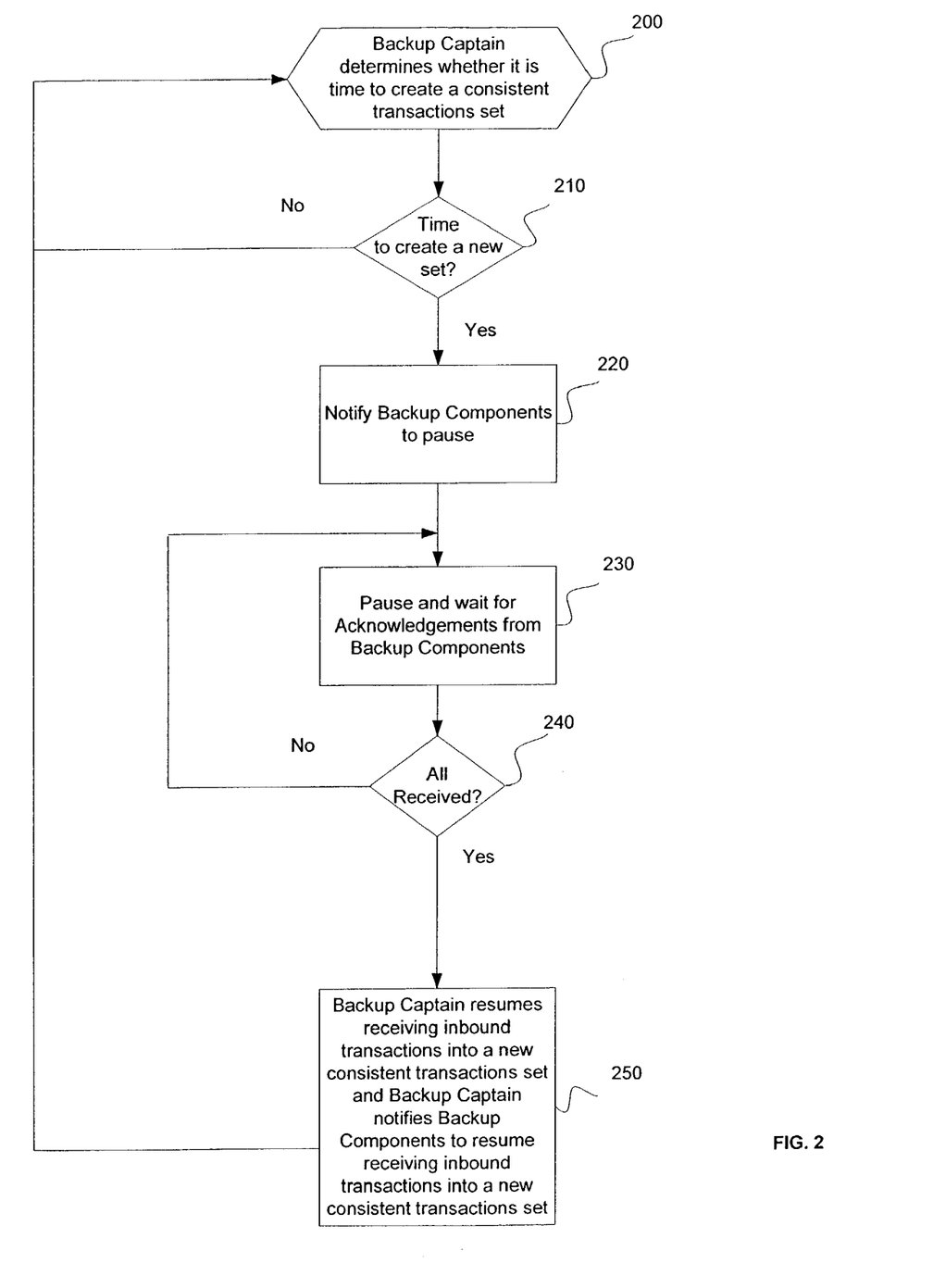
FIG. 2 illustrates logic implemented in the backup captain to control creation of consistent transactions sets in accordance with some implementations of the invention.

FIG. 2 illustrates logic implemented in the backup captain A 100 to control creation of consistent transaction sets. Control begins at block 200 with a backup captain A 100 determining whether it is time to create a consistent transactions set. In particular, a user or administrator specifies the frequency of creating consistent transactions sets, and the backup captain A 100 performs processing to create consistent transactions sets at the specified frequency. For example, if a user desires to have consistent transactions sets made each hour, the backup captain A 100 would determine that consistent transactions sets should be made at one hour intervals.

If it is time to create a consistent transactions set (block 210), the backup captain A 100 continues to block 220; otherwise, the backup captain A 100 returns to block 200. The backup captain A 100 notifies backup components A 100, B 102, and C 104 to pause (i.e., temporarily stop receiving inbound transactions) (block 220). The backup captain A 100 may transmit the identifier for the current set of transactions and may transmit the identifier for the next set of transactions to the backup components A 100, B 102, and C 104. Note that the backup captain A 100 is also a backup component in the example of FIG. 1A. The backup captain A 100 pauses and waits for acknowledgments from the backup components A 100, B 102, and C 104.

In block 240, the backup captain A 100 determines whether all acknowledgments were received. If so, processing continues to block 250; otherwise, processing continues to block 230. Once all acknowledgments are received indicating that the backup components A 100, B 102, and C 104 have paused, the backup captain A 100 resumes receiving inbound transactions into a new consistent transactions set and notifies the backup components A 100, B 102, and C 104 to resume receiving inbound transactions into the new consistent transactions set (block 250).

Although the description herein describes the backup captain A 100 notifying each backup component A 100, B 102, and C 104, including itself, an actual notification to the backup captain A 100 may not be needed in some implementations, as the backup captain A 100 is aware of its sending notifications to other components (e.g., B 102 and C 104) and acts based on sending these notifications. Likewise, although the description herein describes each component A 100, B 102, and C 104 sending an acknowledgment to the backup captain A 100, the backup captain A 100 does not send itself an acknowledgment in some implementations as the backup captain A 100 may have an alternative technique for determining that it has prepared to process a new set of transactions.

Figure 3:
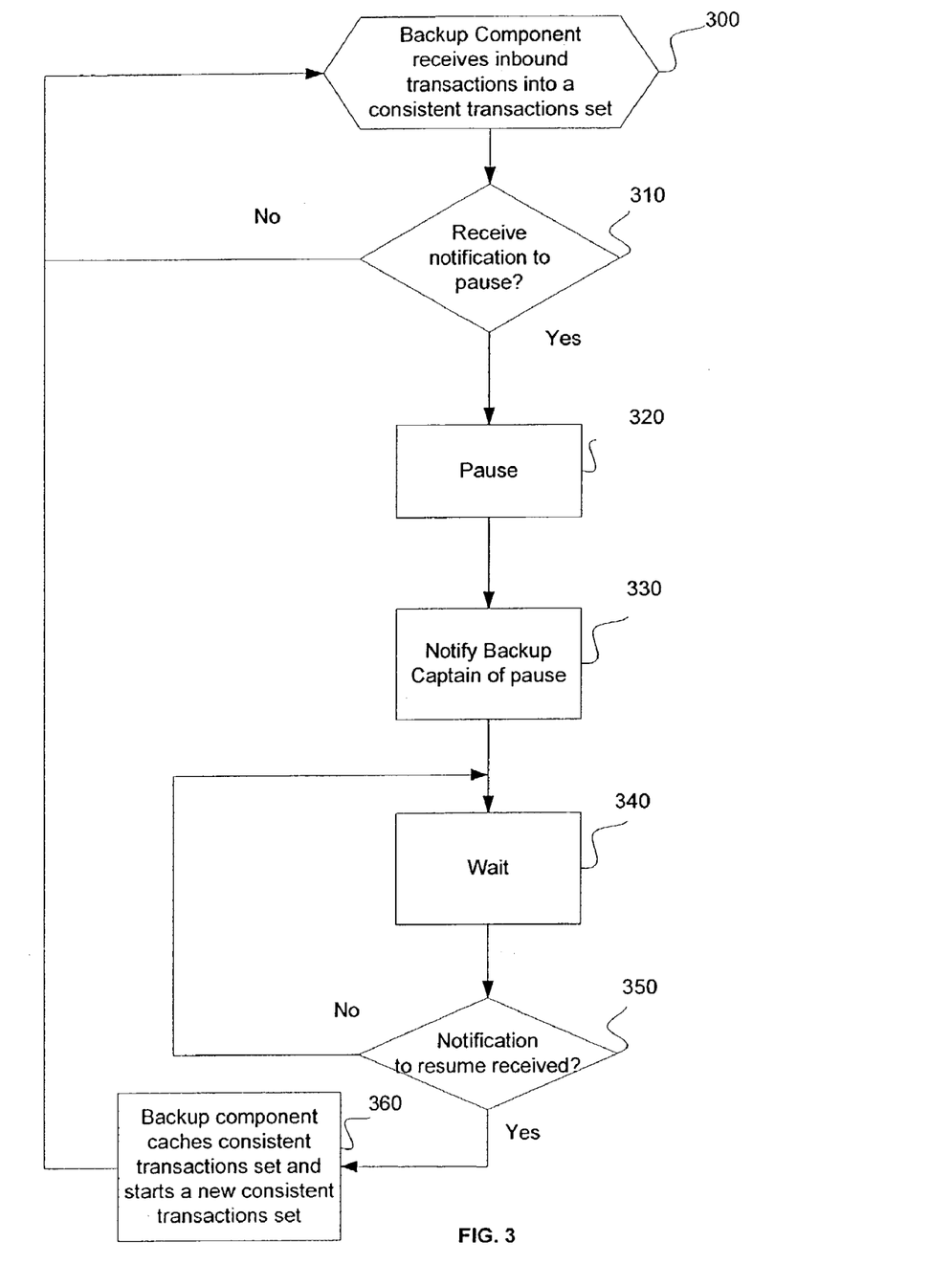
FIG. 3 illustrates logic implemented in backup components in accordance with some implementations of the invention.

FIG. 3 illustrates logic implemented in backup components A 100, B 102, and C 104. Control begins at block 300 with each backup component A 100, B 102 or C104 receiving inbound transactions into a consistent transactions set. The backup components A 100, B 102, and C 104 determine whether a notification to pause has been received from the backup captain A 100 (block 310). If a notification was received, processing continues to block 320, otherwise, processing continues to block 300. In block 320, the backup components A 100, B 102, and C 104 pause.

Then, each backup component A 100, B 102, and C 104 notifies the backup captain A 100 that it has paused (block 330). The backup components A 100, B 102, and C 104 wait (block 340) and periodically determine whether notification to resume receiving inbound transactions has been received (block 350). If so, processing continues to block 360, otherwise processing returns to block 340 and the backup components A 100, B 102, and C 104 wait. In block 360, each backup component A 100, B 102, and C 104 caches the consistent transactions set and starts a new consistent transactions set. In certain implementations, the backup components A 100, B 102, and C 104 process the next set of transactions without waiting for a notification to resume processing.

Alternative techniques for determining which transactions should be associated with particular identifiers are discussed with reference to FIGS. 4 and 5. Each backup component A 100, B 102, and C 104 in a cluster uses the same one of the alternative solutions. Different clusters of backup components may use a different one of the alternative techniques for maintaining consistent transactions sets.

Figure 4:
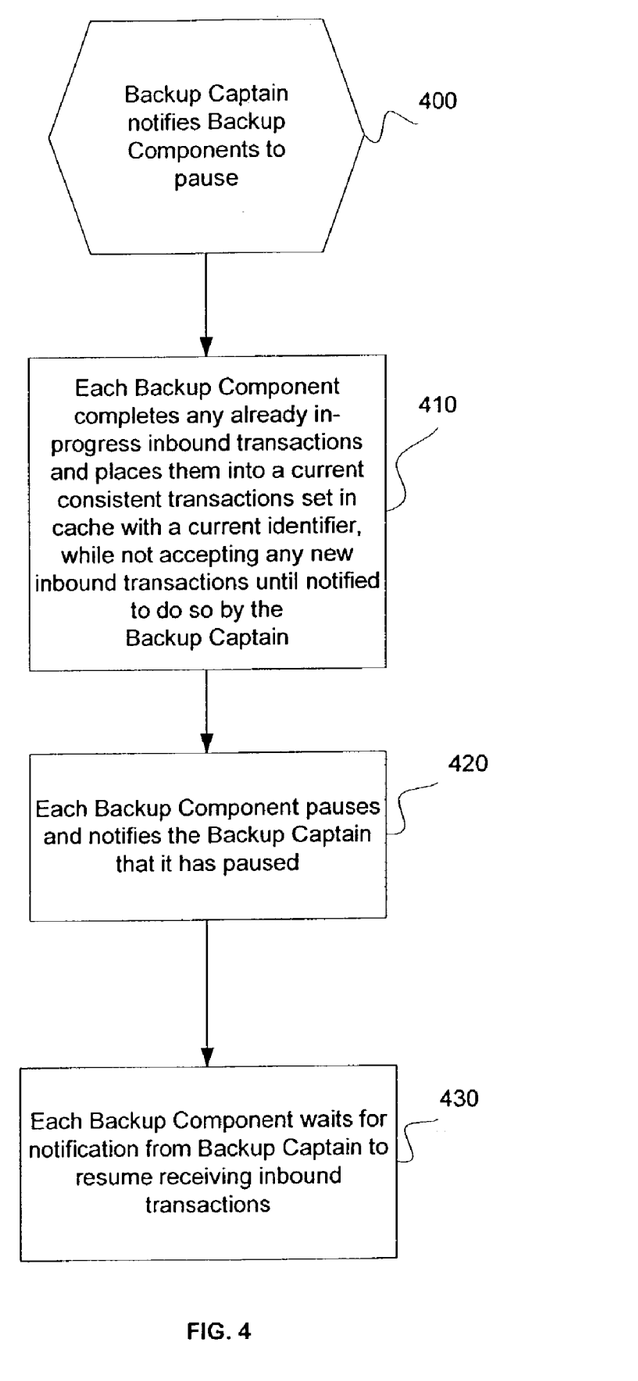
FIG. 4 illustrates logic implemented in a backup components to determine which transactions should be associated with particular identifiers in accordance with some implementations of the invention.

FIG. 4 illustrates logic implemented in a backup components A 100, B 102, and C 104 to determine which transactions should be associated with particular identifiers in accordance with some implementations of the invention. Control begins at block 400 with the backup captain A 100 notifying the backup components A 100, B 102, and C 104 to pause. In block 410, each backup component A 100, B 102, and C 104 completes any already in-progress inbound transactions and places them into a current consistent transactions set in cache with a current identifier (e.g., the color green), while not accepting any new inbound transactions until notified by the backup captain A 100 to do so. When the backup components A 100, B 102, and C 104 resume receiving new inbound transactions, the inbound transactions are associated with a new consistent transactions set. Each backup component A 100, B 102, and C 104 pauses and notifies the backup captain A 100 that it has paused (block 420). Each backup component A 100, B 102, and C 103 waits for notification from the backup captain to resume receiving inbound transactions (block 430).

Figure 5:
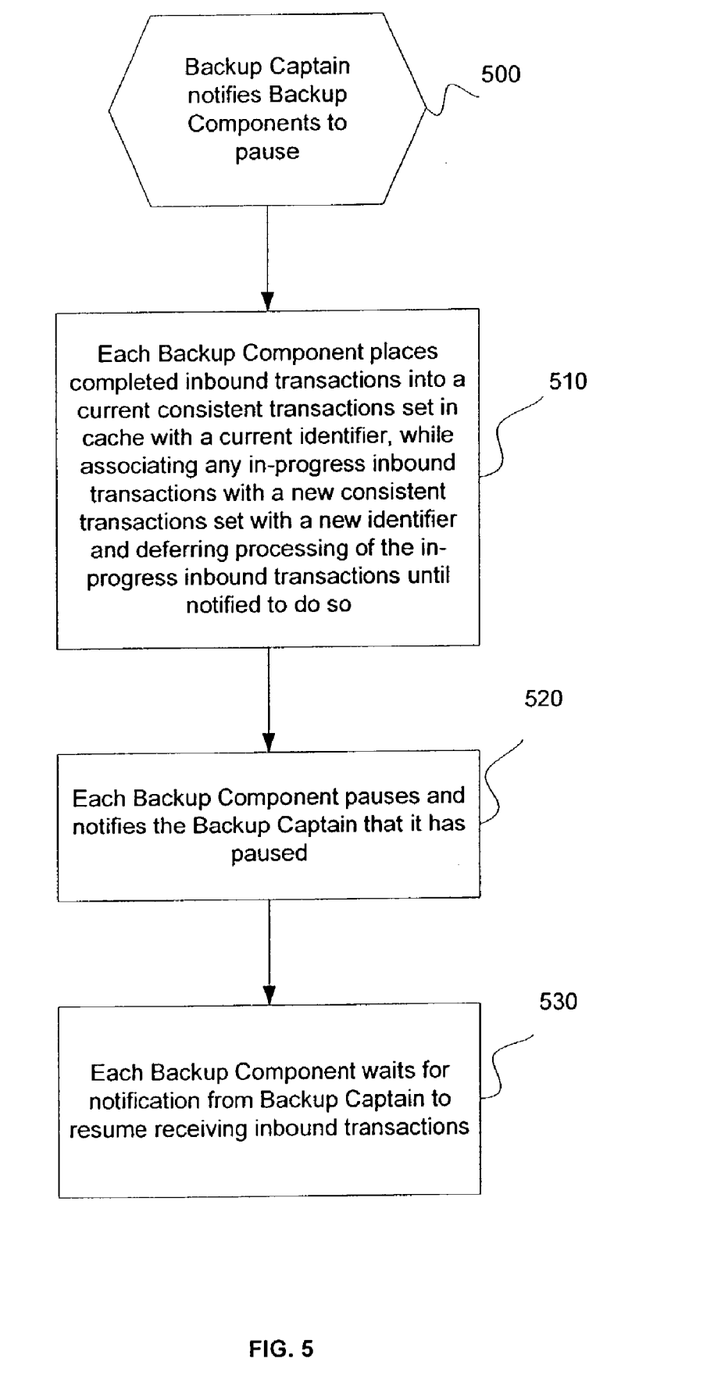
FIG. 5 illustrates logic implemented in a backup components to determine which transactions should be associated with particular identifiers in accordance with further implementations of the invention.

FIG. 5 illustrates logic implemented in a backup components A 100, B 102, and C 104 to determine which transactions should be associated with particular identifiers in accordance with further implementations of the invention. Control begins at block 500 with the backup captain A 100 notifying the backup components A 100, B 102, and C 104 to pause. Each backup component A 100, B 102, and C 104 places completed inbound transactions into a current consistent transactions set in cache with a current identifier while associating any in-progress inbound transactions with a new consistent transactions set with a new identifier and deferring processing of the in-progress inbound transactions (e.g., completion of receipt of the inbound transactions) until notified to do so (e.g., until notified to resume receiving inbound transactions by the backup captain A 100) (block 510). Inbound transactions that are "in-progress" are inbound transactions that are in the process of being received at backup components A 100, B 102, and C 104. In certain inplementations, the backup components A 100, B 102, and C 104 do not acknowledge receipt of the inbound transactions until the inbound transactions are completely received. In certain implementations, the in-progress inbound transactions may be resent when the backup components A 100, B 102, and C 104 resume receiving inbound transactions. Additionally, completely receiving inbound transactions are placed into a current consistent transactions set in cache with a current identifier (block 510).

Each backup component A 100, B 102, and C 104 pauses and notifies the backup captain A 100 that it has paused (block 520). Each backup component A 100, B 102, and C 103 waits for notification from the backup captain to resume receiving inbound transactions (block 530).

Figure 6:
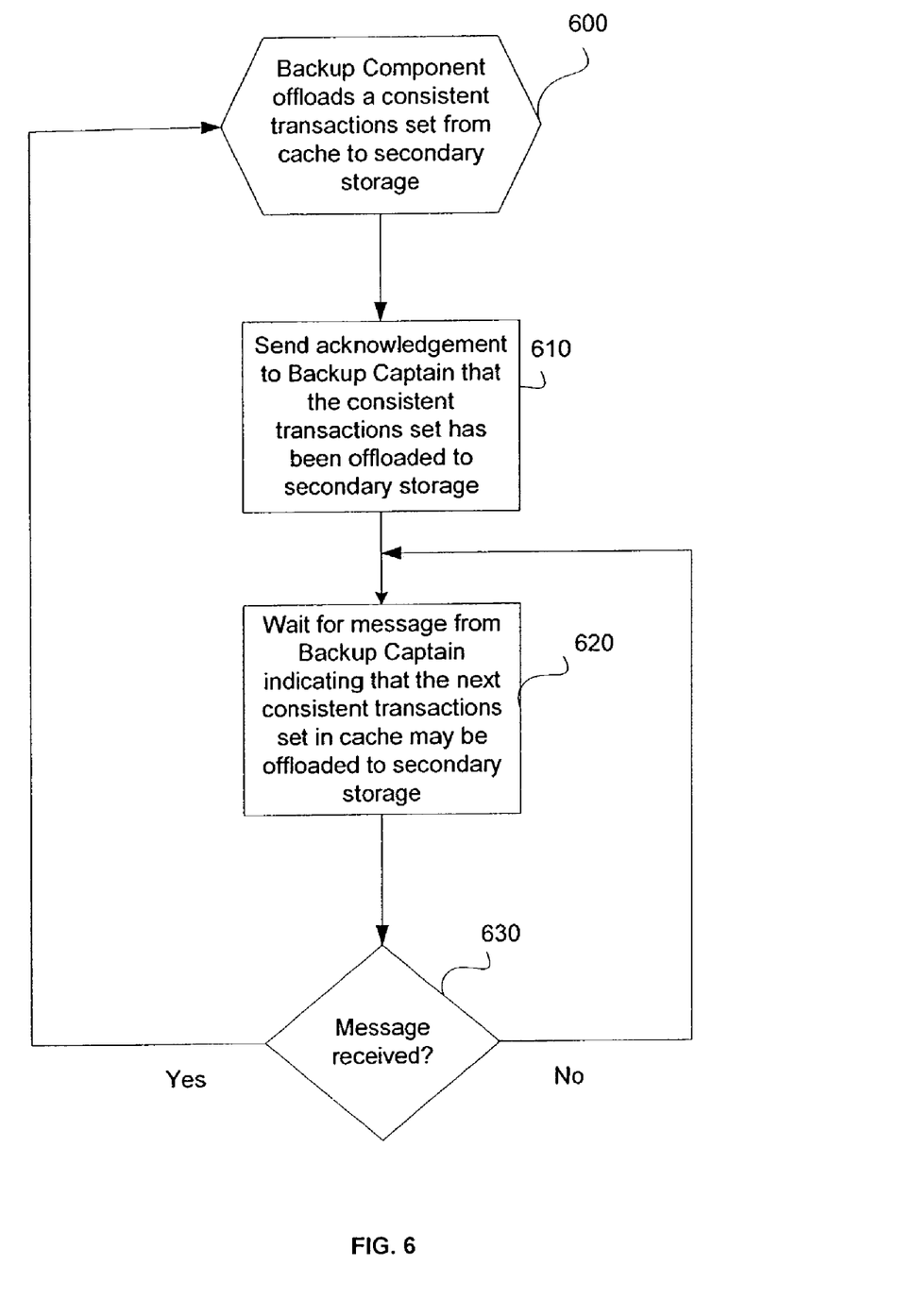
FIG. 6 illustrates logic implemented in the backup components to send outbound transactions in accordance with some implementations.

FIG. 6 illustrates logic implemented in the backup components to send outbound transactions in accordance with some implementations. In FIG. 6, control begins at block 600 with each backup component A 100, B 102, and C 104 offloading a consistent transactions set from cache to secondary storage. In block 610, each backup component A 100, B 102, and C 104 sends an acknowledgment to the backup captain A 100 that the consistent transactions set has been offloaded to secondary storage. Each backup component A 100, B 102, and C 104 may perform the offloading while also performing other processing (e.g., caching another set of transactions). Also, each backup component A 100, B 102, and C 104 may perform the offloading and send the notification at different times (i.e., the backup components A 100, B 102, and C 104 do not necessarily perform the offloading and sending of notifications simultaneously). In block 620, each backup component A 100, B 102, and C 104 waits for a message from the backup captain A 100 indicating that the next consistent transactions set in cache may be offloaded to secondary storage. In block 630, each backup component A 100, B 102, and C 104 determines whether the message has been received. If so, processing continues to block 600 to offload another consistent transactions set. Otherwise, processing continues to block 620 to wait for the message.

Figure 7:
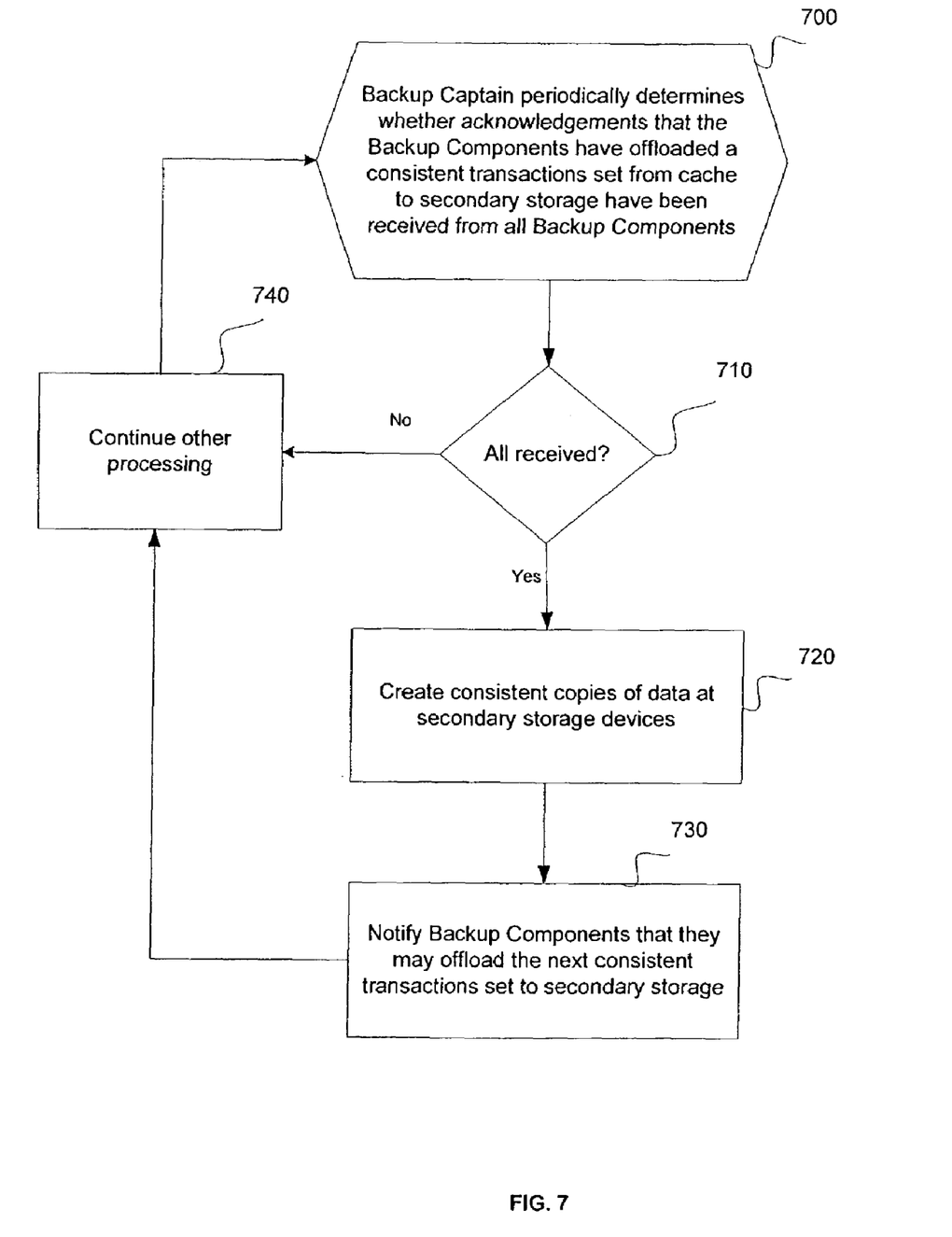
FIG. 7 illustrates logic implemented in the backup captain to initiate creation of consistent copies in accordance with some implementations.

FIG. 7 illustrates logic implemented in the backup captain to initiate creation of consistent copies in accordance with some implementations. In FIG. 7, control begins at block 700 with the backup captain A 100 periodically determining whether acknowledgments that the backup components A 100, B 102, and C 104 have offloaded a consistent transactions set from cache to secondary storage have been received from all backup components A 100, B 102, and C 104. In block 710, the backup captain A 100 determines whether all acknowledgments have been received. If so, processing continues to block 720, otherwise processing continues to block 740. In block 720, the backup captain A 100 creates consistent copies of data at the secondary storage devices A 120, B 140, and C 160. In block 730, the backup captain A 100 notifies the backup components A 100, B 102, and C 104 that the backup components A 100, B 102, and C 104 may offload the next consistent transactions set to secondary storage.

Implementations of the invention provide a method, system, and article of manufacture for maintaining data consistency across different storage devices. Implementations of the invention are particularly useful for mass storage spaces comprised of volumes spread across numerous storage systems. With implementations of the invention, consistent copies of data are made at a secondary site for use in disaster recovery at a recovery site. In certain implementations, the invention allows the backup components to accept backup messages from the primary storage devices while the backup components are forwarding previously cached transactions to the secondary devices.

XRC, PPRC, and ESCON are trademarks of International Business Machines, Inc. of Armonk, N.Y.

Additional Implementation Details

The above described implementations for creating consistent copies may be implemented using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.)). Code in the computer readable medium is accessed and executed by a processor. The code in which preferred implementations are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In the implementations of FIGS. 1A and 1B, the primary control units and secondary control units may be server computers, while the backup components may be personal computers, workstations or other devices for transferring data. Although DASD storage devices are illustrated, any type of storage device may be used. The hosts may be any type of computer, appliance, handheld device, or tool for interacting with the primary control units.

Implementations of the primary control units and secondary control units described herein may be implemented in a mainframe operating system, such as the IBM S/390 system.

The described implementations may apply to database or non-database environments. For instance, the storage devices (e.g., DASD) may store databases, each of which may comprise any type of database used by any type of client application that accesses and manipulates the databases directly over a network without having the transactions executed by database servers.

The logic of FIGS. 2–7 describes specific operations occurring in a particular order. In alternative implementations, certain of the logic operations may be performed in a different order, modified or removed. Morever, steps may be added to the above described logic and still conform to the described implementations. Further, operations described herein may occur sequentially or certain operations may be processed in parallel, or operations described as performed by a single process may be performed by distributed processes.

The logic for maintaining consistency may be applied to the IBM XRC® computing environment, IBM PPRC® environment, or could be applied to maintain consistency in other environments.

In alternative implementations, the data being for which consistency is maintained may include data other than data to be moved between different sites or storage areas for back-up purposes.

In certain implementations, rather than being based on a time period, the set of transactions may be determined based on associations with users or I/O requests issued by applications. For example, one identifier for a set of transactions is associated with a particular user or application.

In certain implementations, rather than the backup captain associating an identifier with a set of transactions, each backup component is able to associate the same identifier with a set of transactions. For example, each backup component may assign the value 000 to the first set of transactions and sequentially increment the value to create identifiers for subsequent sets of transactions (e.g., the second set of transactions may be assigned 001).

The logic of FIGS. 2–7 was described as being implemented in software. This logic may be part of the operating system of the host systems or an application program. In yet further implementations, this logic may be maintained in storage areas managed by the control units or in a read only memory or other hardwired type of device. The preferred logic may be implemented in hard disk drives or in programmable and non-programmable gate array logic.

Some techniques for determining which transactions should be associated with particular identifiers were discussed with reference to FIGS. 4 and 5. Other techniques for associating transactions with particular identifiers may be used.

Figure 8:
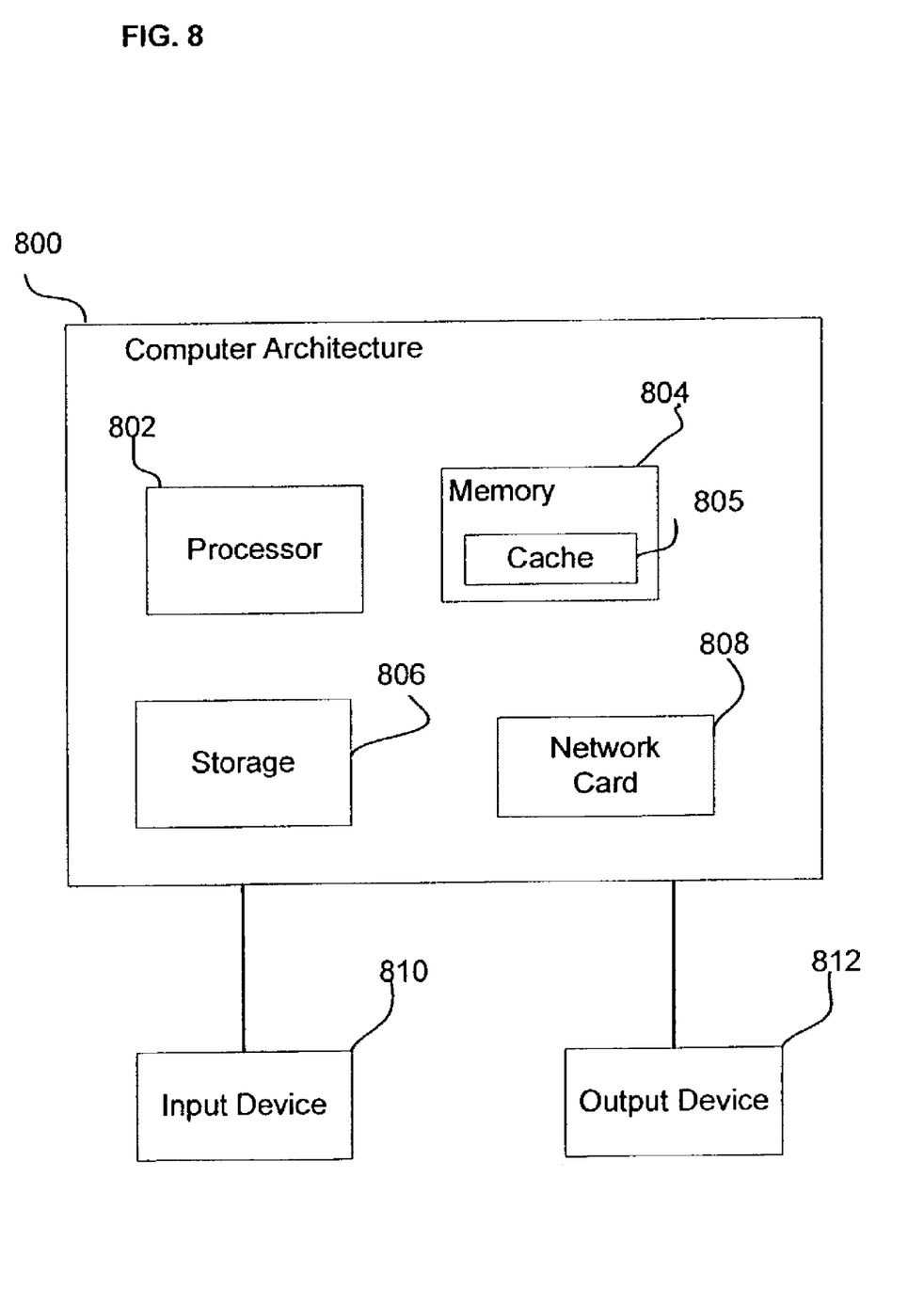
FIG. 8 illustrates an architecture of backup components in accordance with some implementations.

FIG. 8 illustrates an architecture of backup components A 100, B 102, and C 104 in accordance with some implementations. The computer systems A 100, B 102, and C 104 may implement a computer architecture 800 having a processor 802 (e.g., a microprocessor), a memory 804 (e.g., a volatile memory device) including cache 805, and storage 806 (e.g., a non-volatile storage, such as magnetic disk drives, optical disk drives, a tape drive, etc.). The storage 806 may comprise an internal storage device or an attached or network accessible storage. Programs in the storage 806 are loaded into the memory 804 and executed by the processor 802 in a manner known in the art. The architecture further includes a network card 808 to enable communication with a network. An input device 810 is used to provide user input to the processor 802, and may include a keyboard, mouse, pen-stylus, microphone, touch sensitive display screen, or any other activation or input mechanism known in the art. An output device 812 is capable of rendering information transmitted from the processor 802, or other component, such as a display monitor, printer, storage, etc. Primary control units A 110, B 130, and C 150 and secondary control units A 116, B 136, and C 156 may also be implemented with the architecture illustrated in FIG. 8.

The foregoing description of the preferred implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for creating a consistent copy, comprising:
at each component in a cluster of components, wherein one component is a captain, performing:
  (i) forwarding a first cached consistent transactions set to a secondary storage device; and
  (ii) issuing a notification to the captain that the first cached consistent transactions set have been forwarded; and
upon receiving notifications from each component at the captain, performing:
  (i) issuing notifications to one or more secondary storage devices to create one or more consistent copies of data from secondary data to reflect data at corresponding primary storage devices; and
  (ii) issuing a notification to each component to forward a second cached consistent transactions set to the secondary storage devices.

2. The method of claim 1, under control of each component, deferring forwarding the second cached consistent transactions set until receiving a notification to do so from the captain.

3. The method of claim 1, under control of each component, receiving backup messages from primary storage devices.

4. The method of claim 1, wherein the first consistent transactions set and the second consistent transactions set comprise outbound transactions in a cache.

5. The method of claim 1, wherein each consistent transactions set is associated with an identifier.

6. The method of claim 1, wherein each consistent transactions set comprises transactions received within a specified period of time.

7. A method of forming consistent transactions sets, comprising:
notifying one or more backup components to pause in receiving inbound transactions; and
upon receiving an indication from each backup component that the backup component has paused, notifying each backup component to resume receiving inbound transactions into a new consistent transactions set.

8. The method of claim 7, wherein the consistent transactions set is associated with an identifier.

9. The method of claim 8, wherein transactions associated with an identifier comprise transactions received within a specified period of time.

10. The method of claim 7, upon receiving an indication to pause, further comprising:
placing in-progress inbound transactions into a current consistent transactions set with a current identifier.

11. The method of claim 10, further comprising:
rejecting new inbound transactions until receiving a notification to resume receiving inbound transactions.

12. The method of claim 7, upon receiving an indication to pause, further comprising:
associating in-progress inbound transactions with a new consistent transaction set.

13. The method of claim 12, further comprising:
deferring completion of receipt of the in-progress inbound transactions until receiving a notification to resume receiving inbound transactions.

14. A system for creating a consistent copy, comprising:
a cluster of components, wherein one component is a captain;
a cache at each component in the cluster of components;
a computer program executable at each component in the cluster of components, wherein the computer program comprises instructions for:
at each component,
  (i) forwarding a first cached consistent transactions set to a secondary storage device; and
  (ii) issuing a notification to the captain that the first cached consistent transactions set have been forwarded; and
upon receiving notifications from each component at the captain:
  (i) issuing notifications to one or more secondary storage devices to create one or more consistent copies of data from secondary data to reflect data at corresponding primary storage devices; and
  (ii) issuing a notification to each component to forward a second cached consistent transactions set to the secondary storage devices.

15. The system of claim 14, wherein the computer program comprises instructions for, under control of each component, deferring forwarding the second cached consistent transactions set until receiving a notification to do so from the captain.

16. The system of claim 14, wherein the computer program comprises instructions for, under control of each component, receiving backup messages from primary storage devices.

17. The system of claim 14, wherein the first consistent transactions set and the second consistent transactions set comprise outbound transactions in the cache.

18. The system of claim 14, wherein each consistent transactions set is associated with an identifier.

19. The system of claim 14, wherein each consistent transactions set comprises transactions received within a specified period of time.

20. A system of forming consistent transactions sets, comprising:
   a cluster of components, wherein one component is a captain;
   a computer program executable at the captain in the cluster of components, wherein the computer program comprises instructions for:
      notifying one or more backup components to pause in receiving inbound transactions; and
      upon receiving an indication from each backup component that the backup component has paused, notifying each backup component to resume receiving inbound transactions into a new consistent transactions set.

21. The system of claim 20, wherein the consistent transactions set is associated with an identifier.

22. The system of claim 21, wherein transactions associated with an identifier comprise transactions received within a specified period of time.

23. The system of claim 20, at each backup component, wherein the computer program comprises instructions for:
   receiving an indication to pause; and
   placing in-progress inbound transactions into a current consistent transactions set with a current identifier.

24. The system of claim 23, further comprising:
   rejecting new inbound transactions until receiving a notification to resume receiving inbound transactions.

25. The system of claim 20, at each backup component, wherein the computer program comprises instructions for:
   receiving an indication to pause; and
   associating in-progress inbound transactions with a new consistent transactions set.

26. The system of claim 25, wherein the computer program comprises instructions for:
   deferring completion of receipt of the in-progress inbound transactions until receiving a notification to resume receiving inbound transactions.

27. An article of manufacture consisting of one of hardware logic and a computer readable medium including code for creating a consistent copy, wherein the logic or code causes operations, the operations comprising:
   at each component in a cluster of components, wherein one component is a captain, performing:
      (i) forwarding a first cached consistent transactions set to a secondary storage device; and
      (ii) issuing a notification to the captain that the first cached consistent transactions set have been forwarded; and
   upon receiving notifications from each component at the captain, performing:
      (i) issuing notifications to one or more secondary storage devices to create one or more consistent copies of data from secondary data to reflect data at corresponding primary storage devices; and
      (ii) issuing a notification to each component to forward a second cached consistent transactions set to the secondary storage devices.

28. The article of manufacture of claim 27, under control of each component, deferring forwarding the second cached consistent transactions set until receiving a notification to do so from the captain.

29. The article of manufacture of claim 27, under control of each component, receiving backup messages from primary storage devices.

30. The article of manufacture of claim 27, wherein the first consistent transactions set and the second consistent transactions set comprise outbound transactions in a cache.

31. The article of manufacture of claim 27, wherein each consistent transactions set is associated with an identifier.

32. The article of manufacture of claim 27, wherein each consistent transactions set comprises transactions received within a specified period of time.

33. An article of manufacture consisting of one of hardware logic and a computer readable medium including code for creating a consistent copy, wherein the logic or code causes operations, the operations comprising:
   notifying one or more backup components to pause in receiving inbound transactions; and
   upon receiving an indication from each backup component that the backup component has paused, notifying each backup component to resume receiving inbound transactions into a new consistent transactions set.

34. The article of manufacture of claim 33, wherein the consistent transactions set is associated with an identifier.

35. The article of manufacture of claim 34, wherein transactions associated with an identifier comprise transactions received within a specified period of time.

36. The article of manufacture of claim 33, upon receiving an indication to pause, the operations further comprising:
   placing in-progress inbound transactions into a current consistent transactions set with a current identifier.

37. The article of manufacture of claim 36, the operations further comprising:
   rejecting new inbound transactions until receiving a notification to resume receiving inbound transactions.

38. The article of manufacture of claim 33, upon receiving an indication to pause, the operations further comprising:
   associating in-progress inbound transactions with a new consistent transactions set.

39. The article of manufacture of claim 38, the operations further comprising:
   deferring completion of receipt of the in-progress inbound transactions until receiving a notification to resume receiving inbound transactions.

40. A system for creating a consistent copy, comprising:
   a cluster of components, wherein one component is a captain;
   a cache at each component in the cluster of components;
   means for at each component in the cluster of components:
      (i) forwarding a first cached consistent transactions set to a secondary storage device; and
      (ii) issuing a notification to the captain that the first cached consistent transactions set have been forwarded; and
   means for upon receiving notifications from each component at the captain:
      (i) issuing notifications to one or more secondary storage devices to create one or more consistent copies of data from secondary data to reflect data at corresponding primary storage devices; and
      (ii) issuing a notification to each component to forward a second cached consistent transactions set to the secondary storage devices.

* * * * *